(12) United States Patent
Nishimura

(10) Patent No.: US 10,007,313 B2
(45) Date of Patent: Jun. 26, 2018

(54) POWER SUPPLY DEVICE AND ELECTRONIC DEVICE

(71) Applicant: Panasonic Intellectual Property Management Co., Ltd., Osaka (JP)

(72) Inventor: Toshiro Nishimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 15/171,140

(22) Filed: Jun. 2, 2016

(65) Prior Publication Data

US 2016/0274633 A1 Sep. 22, 2016

Related U.S. Application Data

(63) Continuation of application No. PCT/JP2015/000540, filed on Feb. 6, 2015.

(30) Foreign Application Priority Data

Feb. 19, 2014 (JP) .................................. 2014-029687

(51) Int. Cl.
*G06F 1/26* (2006.01)
*H02J 9/06* (2006.01)
(Continued)

(52) U.S. Cl.
CPC ............ *G06F 1/263* (2013.01); *G06F 1/1635* (2013.01); *G06F 1/266* (2013.01); *G06F 1/28* (2013.01);
(Continued)

(58) Field of Classification Search
CPC ........ G06F 1/1635; G06F 1/263; G06F 1/266; G06F 1/28; H02J 1/102; H02J 7/0026; H02J 7/34; H02J 9/061
See application file for complete search history.

(56) References Cited

U.S. PATENT DOCUMENTS 5,227,831 A * 7/1993 Miyazaki ............... G02B 7/102
396/213
5,739,596 A * 4/1998 Takizawa ............... G06F 1/263
307/64
(Continued)

FOREIGN PATENT DOCUMENTS

JP 07-245887 9/1995
JP 10-143290 5/1998
(Continued)

OTHER PUBLICATIONS

International Search Report dated Apr. 21, 2015 in International (PCT) Application No. PCT/JP2015/000540.

*Primary Examiner* — Terrell Johnson
(74) *Attorney, Agent, or Firm* — Wenderoth, Lind & Ponack, L.L.P.

(57) ABSTRACT

An electronic device allows a user to exchange a main battery in a state where an electronic device is continuously operated, even when a backup battery is a small-sized battery charger. The power supply device supplies power for driving an electronic device, and includes a first battery used as a driving power supply, a second battery used as the driving power supply when the first battery is unusable, a booster circuit that increases an output voltage of the second battery, a dummy load circuit for the booster circuit, a battery detachment detector that detects whether the first battery is detachable from the device, and a power controller that switches the driving power supply of the device to the first or second battery. The power controller activates the booster circuit and supplies output power of the booster circuit to the dummy load circuit, when the first battery is detachable.

7 Claims, 5 Drawing Sheets

(51) Int. Cl.
*H02J 1/10* (2006.01)
*H02J 7/34* (2006.01)
*G06F 1/16* (2006.01)
*H02J 7/00* (2006.01)
*G06F 1/28* (2006.01)

(52) U.S. Cl.
CPC ............ *H02J 1/102* (2013.01); *H02J 7/0026* (2013.01); *H02J 7/34* (2013.01); *H02J 9/061* (2013.01)

(56) References Cited

U.S. PATENT DOCUMENTS

| | | | |
|---|---|---|---|
| 2004/0248487 | A1 | 12/2004 | Yasumitsu |
| 2010/0279166 | A1* | 11/2010 | Tseng ............... H01M 10/42 429/123 |
| 2012/0217985 | A1 | 8/2012 | Amanuma |
| 2013/0334277 | A1* | 12/2013 | Shima ............... B25F 5/00 227/131 |
| 2015/0256062 | A1* | 9/2015 | Shirahata ............... H02J 7/32 323/304 |

FOREIGN PATENT DOCUMENTS

| | | |
|---|---|---|
| JP | 2003-101624 | 4/2003 |
| JP | 2011-227753 | 11/2011 |
| JP | 2012-078287 | 4/2012 |

* cited by examiner

POWER SUPPLY DEVICE AND ELECTRONIC DEVICE

BACKGROUND

1. Technical Field

The present disclosure relates to an electronic device driven by a battery, and more particularly to an electronic device including a power supply device capable of being continuously driven by a sub-battery when the main battery is exchanged.

2. Description of Related Art

Unexamined Japanese Patent Publication No. 2003-101624 discloses a detector for detecting detachment/attachment of a battery pack, and an electronic device configured to switch power necessary for operation of the electronic device between the battery pack and a backup battery incorporated in the electronic device based on a detection result of this detector.

According to the electronic device in Unexamined Japanese Patent Publication No. 2003-101624, by action of the backup battery, a user can exchange the battery pack while continuously performing terminal work such as data input. Additionally, when a battery remaining amount of the backup battery becomes little, a data saving process is performed, and therefore it is possible to lose data during the exchange of the battery pack.

SUMMARY

The present disclosure provides a power supply device, in which a user can exchange a battery pack without interruption of manipulation of an electronic device even when a backup battery is a small-sized battery charger, and also provides an electronic device including the power supply device.

The power supply device of the present disclosure is a power supply device for supplying power for driving an electronic device, and includes a first battery used as a driving power supply of the electronic device, a second battery used as the driving power supply in place of the first battery when the first battery is unusable, a booster circuit that increases an output voltage of the second battery, a dummy load circuit that is a load to the booster circuit, a battery detachment detector that detects whether or not the first battery is detachable from the electronic device, and a power controller that switches the driving power supply of the electronic device to the first battery or the second battery, wherein the power controller activates the booster circuit and supplies output power of the booster circuit to the dummy load circuit, when the battery detachment detector detects that the first battery is detachable.

In the power supply device and electronic device including the power supply device of the present disclosure, a user can exchange a battery pack in a state where the electronic device is continuously operated, even when a backup battery is a small-sized battery charger.

DESCRIPTION OF EMBODIMENT

Hereinafter, an exemplary embodiment will be described in detail with reference to drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

Note that, the accompanying drawings and the following description are provided to allow any person skilled in the art to fully understand the present disclosure, and that it is not intended to limit the subject matter described in the claims by the accompanying drawings and the following description.

First Exemplary Embodiment

Hereinafter, a first exemplary embodiment is described with reference to FIGS. 1 to 5.

[1. Configuration]

Figure 1:
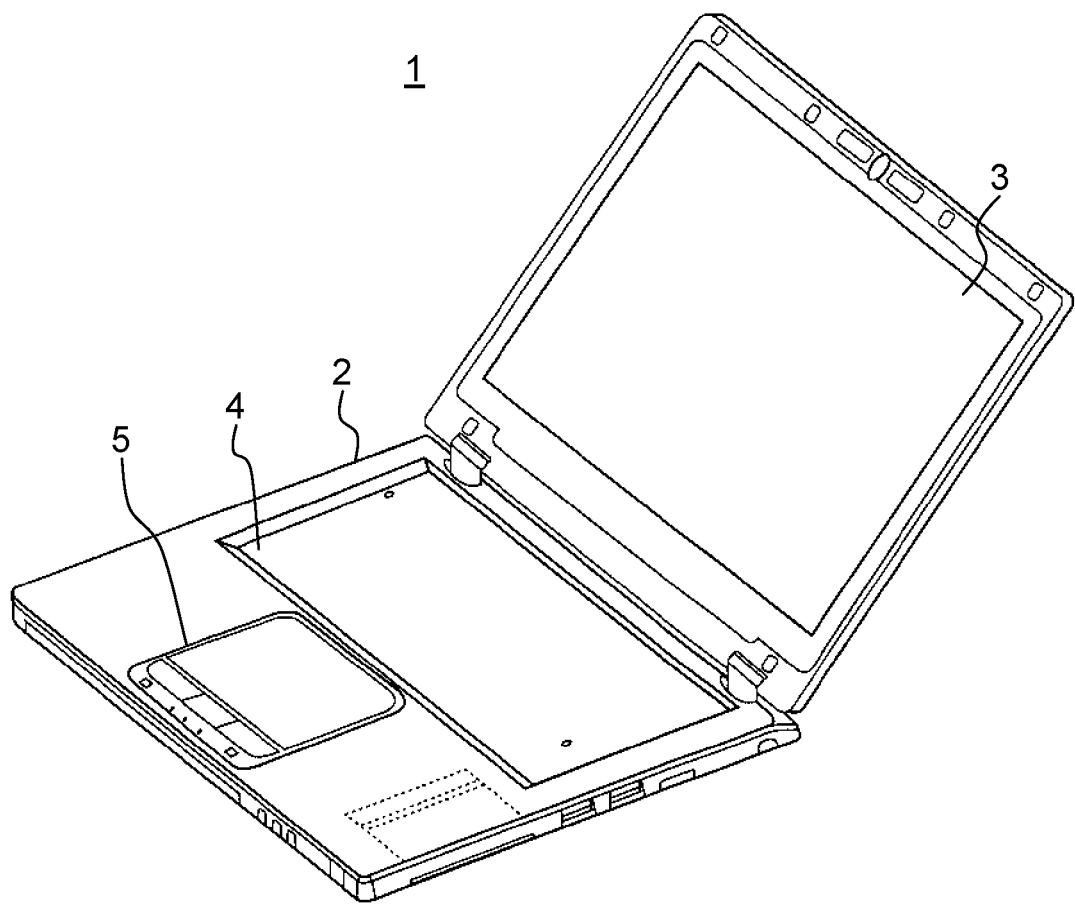
FIG. 1 is a perspective view of a personal computer according to a first exemplary embodiment.

In this exemplary embodiment, a notebook-sized personal computer (Laptop Personal Computer) that is an example of an electronic device is described. FIG. 1 is a perspective view of a personal computer of the first exemplary embodiment. FIG. 1 is an outline drawing of a state where personal computer 1 is open. Personal computer 1 includes main body 2, display 3, keyboard 4, and pointing device 5.

In FIG. 1, personal computer 1 performs operation based on an operation system for controlling basic operation, and application software for controlling various specific processes. Respective functions of these operation system and application software are executed by a program installed in personal computer 1.

Main body 2 includes a storage unit for storing the operation system, the application software, various data, and the like, and an input/output unit having an input/output buffer. A user manipulates personal computer 1 by giving various input instructions by use of keyboard 4 or pointing device 5 in accordance with information displayed on display 3.

Figure 2A:
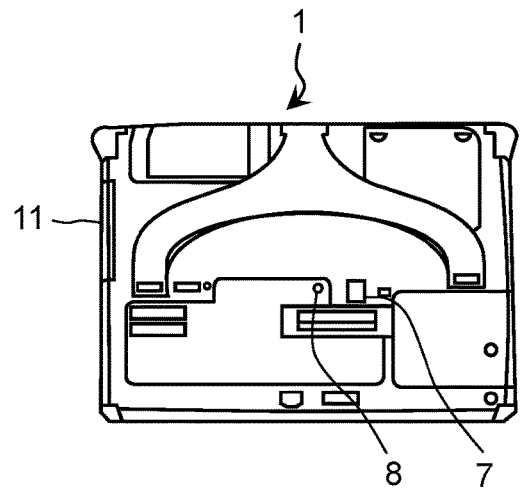
FIG. 2A is a plan view illustrating a first state of a back surface of the personal computer in FIG. 1.
Figure 2B:
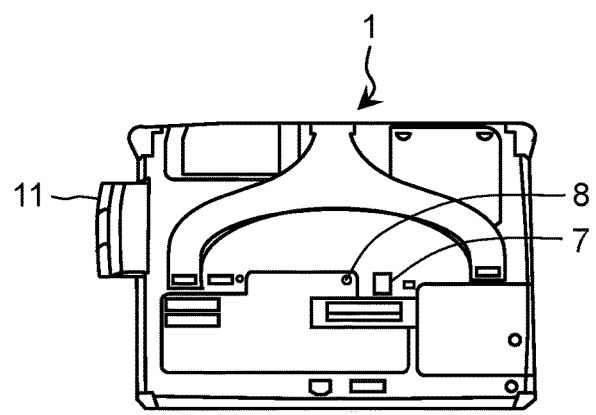
FIG. 2B is a plan view illustrating a second state of the back surface of the personal computer in FIG. 1.
Figure 2C:
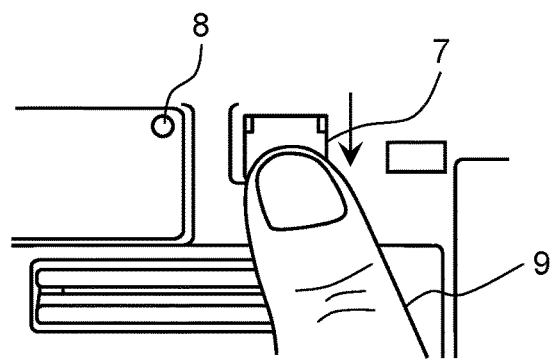
FIG. 2C is a plan view illustrating a third state of the back surface of the personal computer in FIG. 1.

FIG. 2A is a plan view illustrating a first state of a back surface of personal computer 1 in FIG. 1, FIG. 2B is a plan view illustrating a second state of the back surface of personal computer 1 in FIG. 1, and FIG. 2C is a plan view illustrating a third state of the back surface of personal computer 1 in FIG. 1.

In FIG. 2A, personal computer 1 includes main battery 11 that is a detachably attached first battery. Additionally, personal computer 1 includes battery lock knob 7 for locking detachment of main battery 11, and LED (light-emitting diode) 8 for indicating a detachable/undetachable state of main battery 11 by luminescent colors. LED 8, for example, indicates a detachable state when green light is emitted, and indicates an undetachable state when red light is emitted.

In FIG. 2B, in personal computer 1, battery lock knob 7 is released, and main battery 11 is in the detachable state. When main battery 11 is brought into the detachable state, the user can detach main battery 11 from main body 2 by sliding main battery 11.

FIG. 2C illustrates a situation where battery lock knob 7 is manipulated by finger 9 of the user. The user can manipulate detachment of main battery 11 from a locked state to the detachable state by sliding battery lock knob 7 from a top to a bottom in FIG. 2C. As described later, personal computer 1 detects a detachment/attachment state of main battery 11 by a state of battery lock knob 7.

Figure 3:
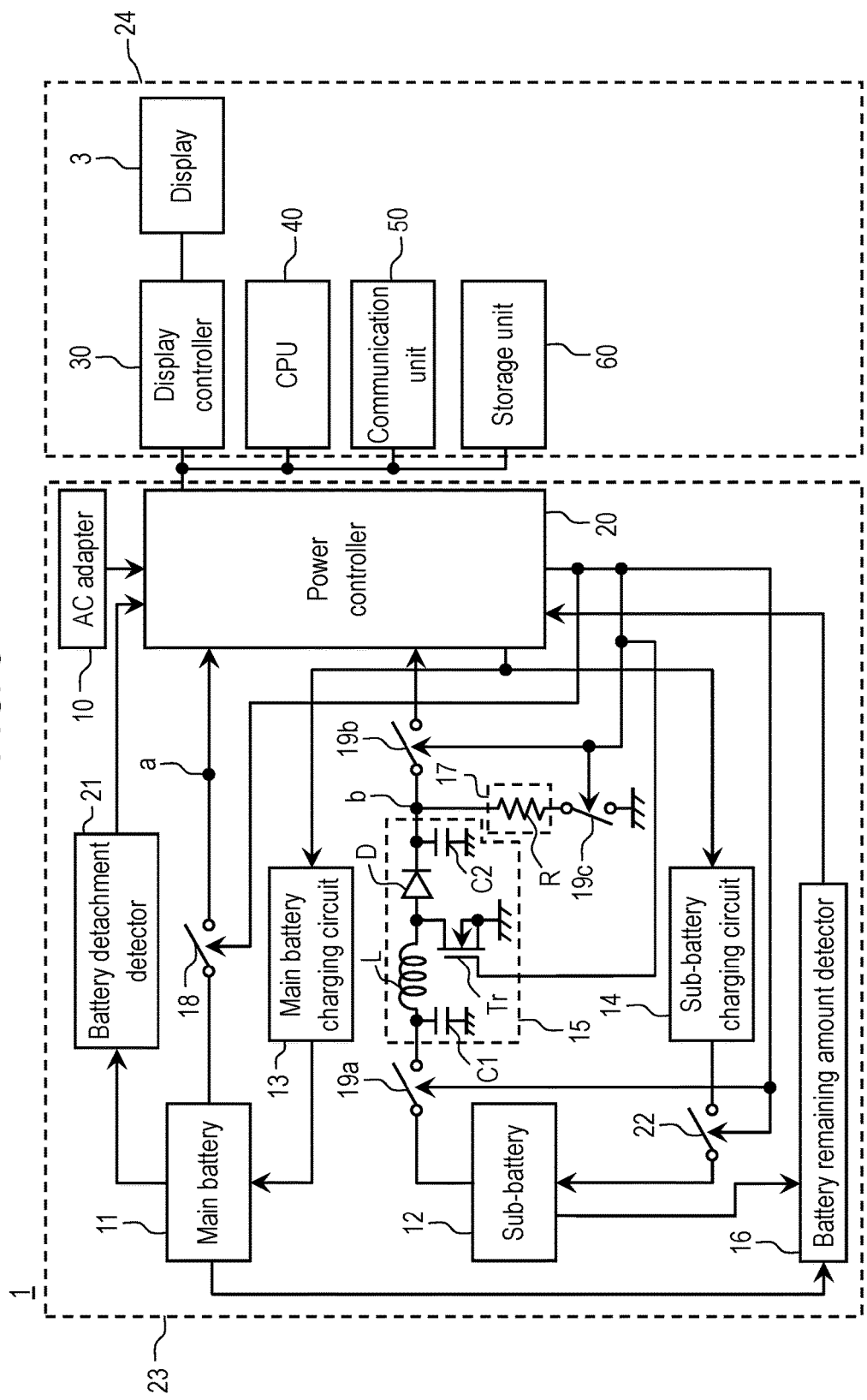
FIG. 3 is a block diagram illustrating an internal configuration of the personal computer in FIG. 1.

FIG. 3 is a block diagram illustrating an internal configuration of personal computer 1 in FIG. 1. In FIG. 3, personal computer 1 that is an electronic device includes load circuit 24, and power supply device 23 for supplying power to load circuit 24. Power supply device 23 includes AC adapter 10 for converting power from a commercial power supply, main battery 11 that is a detachably attached first battery, sub-battery 12 that is a second battery for using as an auxiliary power supply when main battery 11 is exchanged, and battery detachment detector 21 for detecting a detachment/attachment state of main battery 11.

In personal computer 1, in a case where main battery 11 is used as a driving power supply, sub-battery 12 is used as a backup battery when a battery remaining amount of main battery 11 becomes little and main battery 11 is exchanged. Herein, a battery capacity of sub-battery 12 is made smaller than a battery capacity of main battery 11. Accordingly, it is possible to use a small-sized battery charger as sub-battery 12, and therefore it is possible to attain space saving of inside of personal computer 1.

Furthermore, power supply device 23 includes main battery charging circuit 13 connected to main battery 11, sub-battery charging circuit 14 connected to sub-battery 12, and power controller 20 that is an EC (Embedded Controller) microcomputer for controlling power supply and power of a whole of personal computer 1. Additionally, power supply device 23 includes booster circuit 15 connected to an output of sub-battery 12, dummy load circuit 17 that is connected to an output of booster circuit 15, and is a load to booster circuit 15, battery remaining amount detector 16 connected to main battery 11 and sub-battery 12, and switches 18, 19a, 19b, 19c and 22 controlled by power controller 20.

Herein, booster circuit 15 is a general booster circuit configured from first capacitor C1, coil L, diode D, transistor Tr, and second capacitor C2, and a gate electrode of transistor Tr is connected to power controller 20.
Switch 18 is disposed between main battery 11 and power controller 20. Switch 19a is disposed between sub-battery 12 and booster circuit 15. Switch 19b is disposed between a contact point of booster circuit 15 and dummy load circuit 17, and power controller 20. Switch 19c is disposed between dummy load circuit 17 and a ground, and switch 22 is disposed between sub-battery charging circuit 14 and sub-battery 12. Dummy load circuit 17 includes resistor R.

The gate electrode of transistor Tr is controlled by power controller 20 in this exemplary embodiment, but the present disclosure is not limited by this configuration. For example, booster circuit 15 may further include an integrated circuit (IC: Integrated Circuit) (not illustrated), and the gate electrode of transistor Tr may be controlled by this integrated circuit.

An output of each of main battery 11 and sub-battery 12 is connected to load circuit 24 through power controller 20 in FIG. 3, but the present disclosure is not limited by this configuration.

Load circuit 24 includes display controller 30 for controlling display of display 3, CPU (Central Processing Unit) 40 that is an arithmetic processor for controlling operation of the whole of personal computer 1, communication unit 50 connected to a communication network such as radio communication, and storage unit 60 for temporally or permanently storing data necessary for a process of CPU 40. Herein, display 3 is an arbitrary display device such as a liquid crystal display or an organic EL display. The communication network connected to communication unit 50 includes known various networks. Examples of the communication network includes a WWAN (Wireless Wide Area Network) that is a communication service connected to a wide area data communication network by radio communication, a WLAN (Wireless Local Area Network/Wireless LAN) that is a local area network for transmitting/receiving data by radio, a WiMAX (registered trademark) (Worldwide Interoperability for Microwave Access) network that is one of standards of a radio communication technology, a wired LAN (Local Area Network) that is a local area network for connecting a device by a communication cable such as a copper wire or an optical fiber, and performing communication by transition/reception of electricity or light, and the like. For storage unit 60, a volatile memory, a nonvolatile memory, an HDD (Hard Disk Drive), an SSD (Solid State Drive), an eMMC (embedded Multi Media Card), or the like is used.

Personal computer 1 includes AC adapter 10, main battery 11, and sub-battery 12, as a driving power supply of personal computer 1. Herein, AC adapter 10 is an adapter capable of being connected to a commercial power supply provided in a house, and converts an AC current from the commercial power supply into a predetermined DC current. Additionally, main battery 11 and sub-battery 12 each are a rechargeable secondary battery, and may each employ a known battery charger such as a lithium ion battery or a lithium polymer battery.

In personal computer 1, in a case where AC adapter 10 is connected to the commercial power supply, AC adapter 10 is employed as the driving power supply of personal computer 1. Additionally, in a case where AC adapter 10 is not connected to the commercial power supply, main battery 11 is employed as the driving power supply. Sub-battery 12 is used as the driving power supply in place of main battery 11, when main battery 11 is unusable during battery exchange of main battery 11, or the like. Personal computer 1 includes sub-battery 12, so that main battery 11 is configured to enable hot swap allowing battery exchange, in a state where the power supply of personal computer 1 is turned on, and input manipulation or the like is continued.

Booster circuit 15 increases an output voltage of sub-battery 12 up to substantially the same level as an output voltage of main battery 11, based on a control signal from power controller 20. Dummy load circuit 17 consumes an output current from booster circuit 15. That is, at a time of activation of booster circuit 15, a current is first supplied to dummy load circuit 17, before an output voltage of booster circuit 15 is supplied to load circuit 24. Consequently, switching operation of transistor Tr in booster circuit 15 is brought into a state when booster circuit 15 is connected to a high load, and thereafter power is supplied from booster circuit 15 to load circuit 24. That is, booster circuit 15 is activated, and the output voltage of booster circuit 15 is not supplied to load circuit 24, but first supplied to dummy load circuit 17. Thereafter, the output voltage of booster circuit 15 is supplied to load circuit 24. With such a configuration, load circuit 24 can receive power supply in which a voltage drop of sub-battery 12 is minimized.

In a case where an integrated circuit for controlling the gate electrode of transistor Tr is provided inside booster circuit 15, the integrated circuit controls the switching operation of transistor Tr.

Main battery charging circuit 13 supplies power from AC adapter 10 to main battery 11 to charge main battery 11. Additionally, sub-battery charging circuit 14 supplies power from AC adapter 10 or main battery 11 to sub-battery 12 to charge sub-battery 12. Battery remaining amount detector 16 detects battery remaining amounts of main battery 11 and sub-battery 12.

Power controller 20 switches a driving power supply of load circuit 24 such that power is supplied from any of AC adapter 10, main battery 11, and sub-battery 12. Power controller 20 may perform control so as not to charge sub-battery 12 but to turn off switch 22 based on an output of battery remaining amount detector 16, in a case where the battery remaining amount of sub-battery 12 is a predetermined value or more.

Power controller 20 performs on/off-control controls of switches 18, 19a, 19b and 19c, so that a power supply for supplying power to load circuit 24 is switched to main battery 11 or sub-battery 12.

Battery detachment detector 21 determines that main battery 11 is in a detachable state, when battery lock knob 7 is released. Additionally, battery detachment detector 21 determines that main battery 11 is in an undetachable state, when battery lock knob 7 is locked.

The determination of the detachment/attachment state of main battery 11 by battery detachment detector 21 is performed by a configuration in which an open/closed state of a battery lid for covering main battery 11 and storing main battery 11 in personal computer 1 is detected by an output of an incorporated magnet switch, in addition to a configuration of detection of a state of battery lock knob 7. In the configuration of detection of the open/closed state of the battery lid, for example, main battery 11 determines that main battery 11 is in the detachable state when the battery lid is open, and main battery 11 determines that main battery 11 is in the undetachable state when the battery lid is closed. That is, main battery 11 is covered with the battery lid to be stored in the main body inside personal computer 1, and battery detachment detector 21 may detect that main battery 11 is in the detachable state, when it is detected that the battery lid is open. Furthermore, the determination of the detachment/attachment state of main battery 11 by battery detachment detector 21 may be performed by a configuration in which detachment of a main body of main battery 11 is detected by an output of an incorporated magnet switch.

[2. Operation]

Operation of power controller 20 during exchange of main battery 11, in thus configured personal computer 1 is described as follows.

Figure 4:
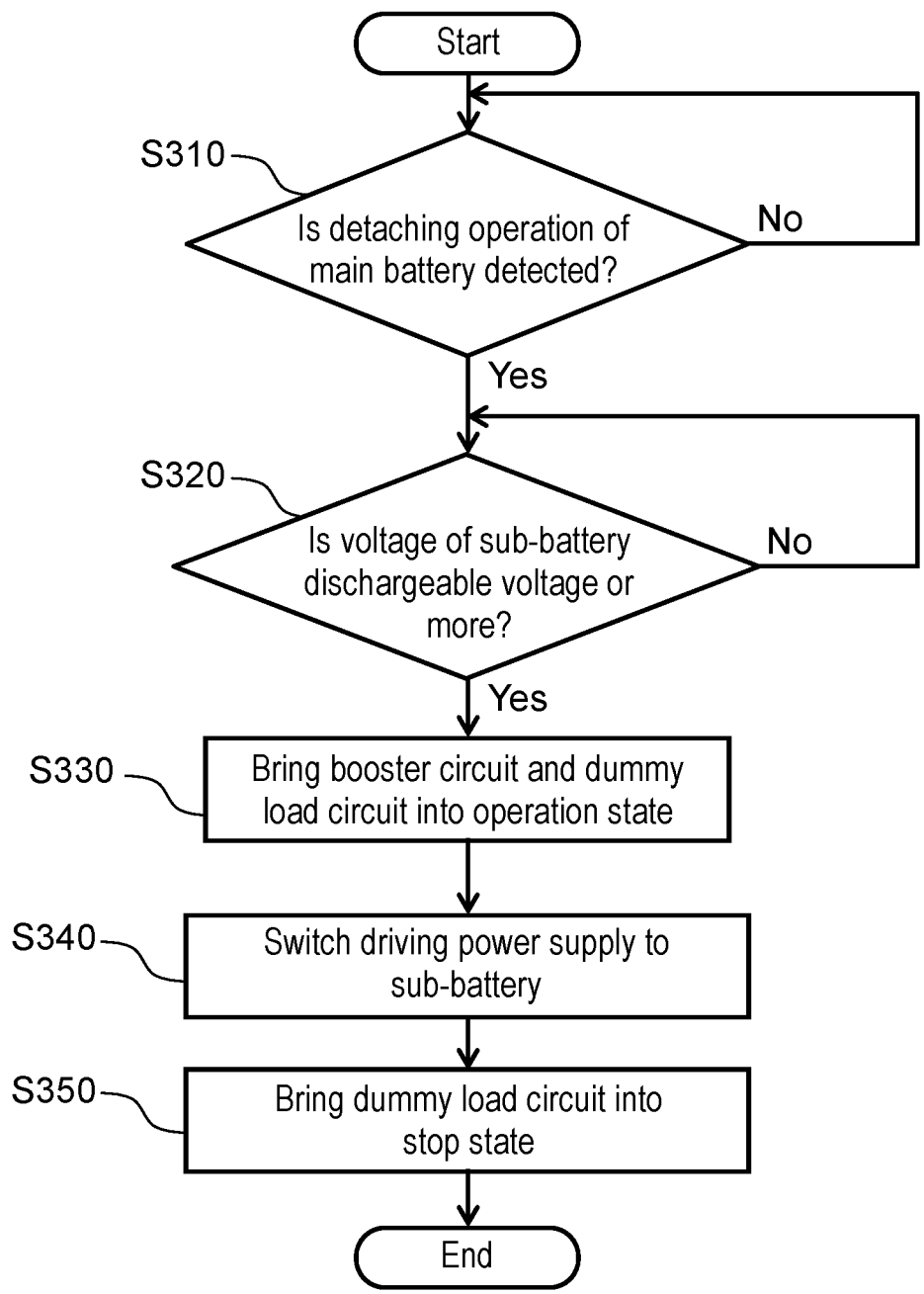
FIG. 4 is a flowchart illustrating operation of battery exchange according to the first exemplary embodiment.

FIG. 4 is a flowchart illustrating operation of battery exchange according to the first exemplary embodiment. As to the battery exchange in this exemplary embodiment, a user has a plurality of main batteries 11, and detaches main battery 11 stored in personal computer 1 from personal computer 1 to exchange this main battery 11 with another main battery 11 which is previously charged by a charger or the like, when an battery remaining amount of main battery 11 stored in personal computer 1 is reduced.

(Step S310) Power controller 20 determines whether or not detachment of main battery 11 is detected, based on an output of battery detachment detector 21. As described above, battery detachment detector 21, for example, detects the open/closed state of battery lock knob 7, or detects the opening of the battery lid by the output of the magnet switch, so that battery detachment detector 21 determines whether or not detachment of main battery 11 from personal computer 1 is detected. In a case where the detachment of main battery 11 is detected, operation of power controller 20 advances to Step S320. In a case where the detachment of main battery 11 is not detected (case of No), operation of power controller 20 repeats a process of Step S310 to be brought into a standby state. Power controller 20 may perform other program operation during this standby state.

(Step S320) Power controller 20 determines whether or not a voltage of sub-battery 12 is a dischargeable voltage or more. In a case where the voltage of sub-battery 12 is less than the dischargeable voltage (case of No), the operation of power controller 20 repeats a process of Step S320 to be brought into the standby state. In a case where the voltage of sub-battery 12 is the dischargeable voltage or more (case of Yes), the operation of power controller 20 advances to Step S330.

(Step S330) Power controller 20 turns on switches 19a and 19c to bring booster circuit 15 and dummy load circuit 17 into an operation state. On the other hand, switch 18 is maintained in an on state, and switch 19b is maintained in an off state. When battery detachment detector 21 determines that the detachment of main battery 11 is possible, power controller 20 performs control such that both of booster circuit 15 and dummy load circuit 17 operate. That is, an output voltage of sub-battery 12 is increased by switching operation of transistor Tr of booster circuit 15. At this time, right after booster circuit 15 is activated, an output voltage supplied to load circuit 24 greatly drops. Accordingly, in order to suppress the voltage drop of this output voltage supplied to load circuit 24, an output current from booster circuit 15 is supplied to dummy load circuit 17.

When the driving power supply of load circuit 24 is switched from main battery 11 to sub-battery 12, switching of transistor Tr of booster circuit 15 in a stop state is brought into an operation state. At this time, booster circuit 15 is activated from an unloaded state, and therefore cannot follow a response speed to a load current to be supplied to load circuit 24, and a rapid voltage drop occurs in the output voltage of booster circuit 15. Furthermore, in a case where a high load is generated in load circuit 24, for example, in a case where a communication process of communication unit 50 is performed, or in a case where a process of CPU 40 is performed, a width of this voltage drop increases, personal computer 1 is brought into a shutdown state, and the user must suspend manipulation of personal computer 1.

In personal computer 1 of this exemplary embodiment, booster circuit 15 is activated, and dummy load circuit 17 is activated, so that the output current from booster circuit 15 is not supplied to load circuit 24, but first supplied to dummy load circuit 17. Consequently, the switching operation of transistor Tr in booster circuit 15 is brought into the state where booster circuit 15 is connected to the high load. Therefore, even when the output current from booster circuit 15 is supplied to load circuit 24 after that, the voltage supplied to load circuit 24 is maintained in a small voltage drop state. That is, load circuit 24 can receive stable power from sub-battery 12 also when main battery 11 is exchanged.

(Step S340) When a voltage difference between an output voltage of main battery 11, namely, a voltage of node a in FIG. 3, and an output voltage of booster circuit 15, namely, a voltage of node b in FIG. 3 becomes less than a predetermined voltage difference, power controller 20 turns on switch 19b, and switches the driving power supply of load circuit 24 from main battery 11 to sub-battery 12. Power controller 20 performs control such that the driving power supply of load circuit 24 is switched from main battery 11 to sub-battery 12, based on a voltage difference between the output voltage of main battery 11 and an output voltage of sub-battery 12.

The switching of the driving power supply of load circuit 24 from main battery 11 to sub-battery 12 may be performed by a method other than the method based on the voltage difference between the output voltage of main battery 11 and the output voltage of sub-battery 12 by power controller 20.

(Step S350) Thereafter, switch 19c is turned off, and dummy load circuit 17 is stopped, so that the process is terminated. Herein, after switch 19c is turned on, and a predetermined time elapses, switch 19c may be turned off. For example, a voltage at an arbitrary part such as the voltage of node b in FIG. 3 becomes a predetermined voltage value or more, namely, after it is determined that a voltage supplied from booster circuit 15 to load circuit 24 is stabilized, switch 19c may be turned off. That is, after the driving power supply of load circuit 24 is switched from main battery 11 to sub-battery 12, power controller 20 performs control such that dummy load circuit 17 is stopped, and supply of the output voltage of booster circuit 15 to dummy load circuit 17 is stopped.

Figure 5:
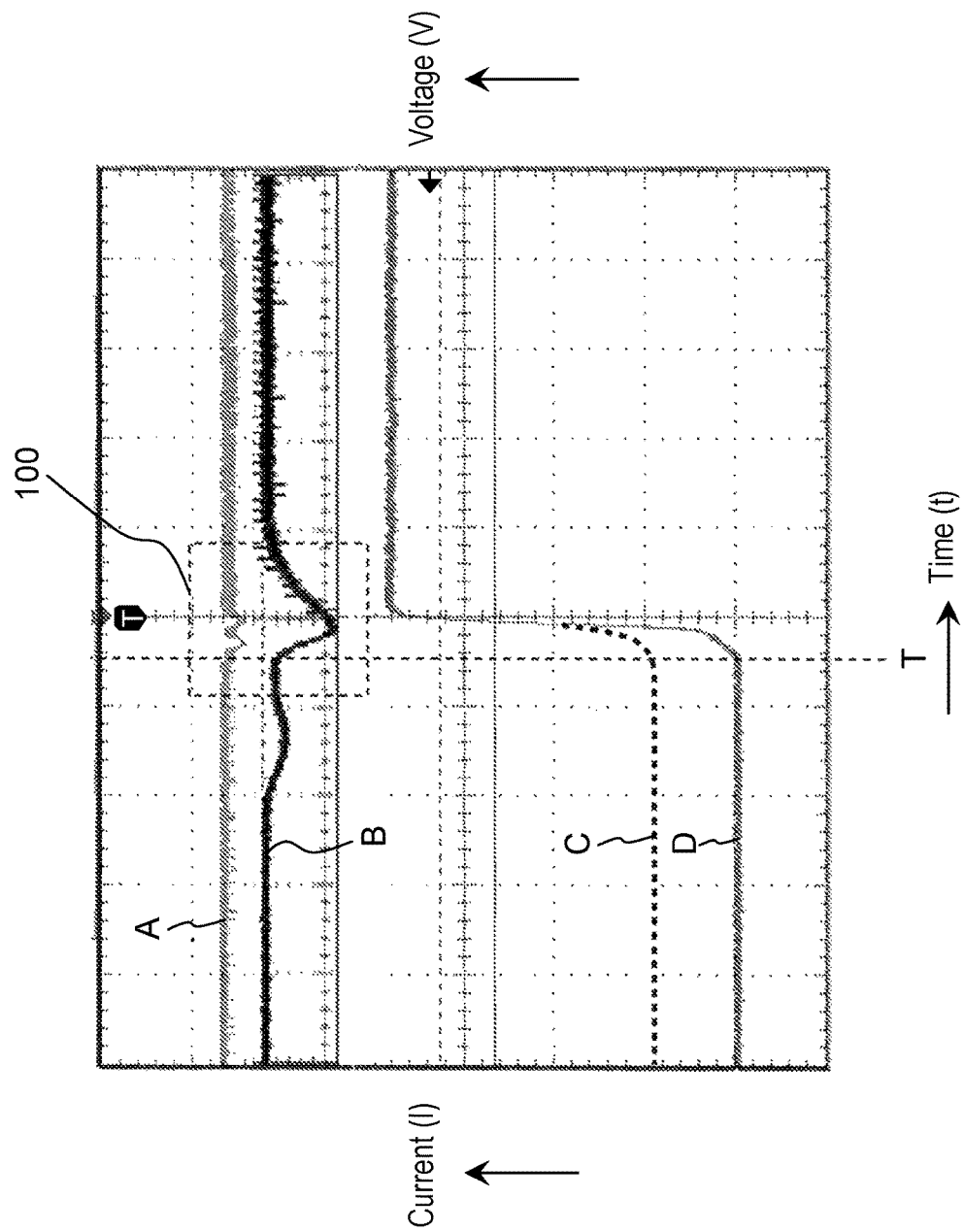
FIG. 5 is a time base waveform chart illustrating a change in a voltage and a current to time, during battery exchange according to the first exemplary embodiment.

FIG. 5 is a time base waveform chart illustrating a change in voltage (V) and current (I) to time t during battery exchange according to the first exemplary embodiment. In FIG. 5, curved line A is an output voltage supplied to load circuit 24 in a case where dummy load circuit 17 is connected, and curved line B is an output voltage supplied to load circuit 24 in a case where dummy load circuit 17 is not connected. Additionally, curved line C is an output current supplied to load circuit 24 in a case where dummy load circuit 17 is connected, and curved line D is an output current supplied to load circuit 24 in a case where dummy load circuit 17 is not connected.

In FIG. 5, at time T, switch 19b is turned on, so that a voltage and a current are supplied from sub-battery 12 to load circuit 24. Herein, in region 100, a voltage drop width of the output voltage in the case where dummy load circuit 17 is connected, indicated by curved line A is smaller than a voltage drop width of the output voltage in the case where dummy load circuit 17 is not connected, indicated by curved line B. Accordingly, in a case where the output current from booster circuit 15 is supplied to dummy load circuit 17, and thereafter supplied to load circuit 24, it is found that a voltage drop of the output voltage of booster circuit 15 is suppressed compared to the case where dummy load circuit 17 is not connected. Therefore, the user can exchange main battery 11 in a state where personal computer 1 is continuously operated.

[3. Effect and the Like]

As described above, in this exemplary embodiment, the power supply device is a power supply device for supplying power for driving an electronic device, and includes a first battery used as a driving power supply of the electronic device, a second battery used as the driving power supply in place of the first battery when the first battery is unusable, a booster circuit that increases an output voltage of the second battery, a dummy load circuit that is a load to the booster circuit, a battery detachment detector that detects whether or not the first battery is detachable from the electronic device, and a power controller that switches the driving power supply of the electronic device to the first battery or the second battery, wherein the power controller activates the booster circuit and supplies output power of the booster circuit to the dummy load circuit, when the battery detachment detector detects that the first battery is detachable.

Consequently, when the switching is performed from main battery 11 to sub-battery 12 as the driving power supply, an output current from booster circuit 15 is first supplied to dummy load circuit 17, and is maintained in a state when switching operation of transistor Tr in booster circuit 15 is connected to a high load, and thereafter power from sub-battery 12 is supplied to load circuit 24. Consequently, it is possible to prevent a rapid drop of the output voltage from booster circuit 15 at a time of power supply switching, and it is possible to switch the driving power supply from main battery 11 to sub-battery 12.

Resistor R is used as dummy load circuit 17 in the first exemplary embodiment, but dummy load circuit 17 is not limited to this. For example, any circuit that generates a load to booster circuit 15 may be employed.

The personal computer is used as an example of the electronic device in the first exemplary embodiment, but the electronic device is not limited to this. For example, an electronic device enabling battery exchange, such as a tablet terminal, a portable telephone, a video camera, a portable TV (TeleVision), a portable BD (Blu-ray (registered trademark) Disc) player may be employed.

The sub-battery is fixed inside the personal computer in the first exemplary embodiment, but the present disclosure is not limited to this configuration. For example, the sub-battery may be detachable similarly to the main battery.

The present disclosure is applicable to any electronic device enabling battery exchange. Specifically, the present disclosure is applicable to a tablet terminal, a portable telephone, a video camera, a portable TV, a portable BD player, or the like.

What is claimed is:

1. A power supply device for supplying power for driving an electronic device, the power supply device comprising:
   a first battery used as a driving power supply of the electronic device;
   a second battery used as the driving power supply in place of the first battery when the first battery is unusable;
   a booster circuit that increases an output voltage of the second battery;
   a dummy load circuit that is a load to the booster circuit;
   a battery detachment detector that detects whether or not the first battery is detachable from the electronic device; and
   a power controller that switches the driving power supply of the electronic device to the first battery or the second battery,
   wherein the power controller activates the booster circuit and supplies output power of the booster circuit to the dummy load circuit, when the battery detachment detector detects that the first battery is detachable, and
   the power controller controls a connection of the dummy load circuit to suppress a voltage drop of the output power of the booster circuit, the voltage drop occurring when connecting the electronic device to the power supply device.

2. The power supply device according to claim 1, wherein the electronic device includes a battery lock knob that locks detachment operation of the first battery, and the battery detachment detector detects that the first battery is detachable from the electronic device by detecting release of the battery lock knob.

3. The power supply device according to claim 1, wherein the power controller performs control such that the driving power supply is switched from the first battery to the second battery, based on a voltage difference between an output voltage of the first battery and the output voltage of the second battery.

4. The power supply device according to claim 3, wherein the power controller performs control such that the supply of the output power of the booster circuit to the dummy load circuit is stopped, after the driving power supply is switched from the first battery to the second battery.

5. The power supply device according to claim 1, wherein a battery capacity of the second battery is smaller than a battery capacity of the first battery.

6. An electronic device comprising the power supply device according to claim 1.

7. The electronic device according to claim 6, comprising an LED indicating a detachable or undetachable state of the first battery by a luminescent color.

* * * * *